United States Patent [19]

Komukai

[11] Patent Number: 4,544,561

[45] Date of Patent: Oct. 1, 1985

[54] METHOD OF MANUFACTURING FOOD RESEMBLING SCALLOP AND FOOD RESEMBLING SCALLOP OBTAINED BY THE SAME METHOD

[75] Inventor: Chogo Komukai, Aomori, Japan

[73] Assignee: Hachinohe Kanzume Co., Ltd., Aomori, Japan

[21] Appl. No.: 600,739

[22] Filed: Apr. 16, 1984

[30] Foreign Application Priority Data

Apr. 15, 1983 [JP] Japan ................................. 58-66436
Apr. 15, 1983 [JP] Japan ............................. 58-56393[U]

[51] Int. Cl.⁴ ............................................. A23L 1/325
[52] U.S. Cl. .................................... 426/104; 426/574; 426/643; 426/513; 426/802
[58] Field of Search ............... 426/104, 574, 643, 512, 426/517, 802, 513

[56] References Cited

U.S. PATENT DOCUMENTS 3,863,017 1/1975 Yueh .................................... 426/643
4,158,065 6/1979 Sugino ................................. 426/104
4,303,688 12/1981 Shimura et al. ................. 426/643 X
4,362,752 12/1982 Sugino et al. .................... 426/574 X
4,396,634 8/1983 Shenouda et al. .............. 426/574 X

*Primary Examiner*—Robert Yoncoskie
*Attorney, Agent, or Firm*—Sughrue, Mion, Zinn, Macpeak & Seas

[57] ABSTRACT

A material mainly composed of ground fish meat is molded into the form of a strip, which is then set by heating. After the material has been solidified, it is then cut into the form of filaments. A plurality of these filaments are bundled and integrated without use of any binder but by applying a combination of a predetermined uniform peripheral pressure and local extra pressure to form peripheral circular recesses on cylindrically compacted material at a constant interval. Under this pressed state, the material is heated by boiling to obtain a cylindrical material. The cylindrical material is then cut along the center of each peripheral annular recess to obtain a food product resembling the scallop meat and having round opposite end corners.

7 Claims, 7 Drawing Figures

METHOD OF MANUFACTURING FOOD RESEMBLING SCALLOP AND FOOD RESEMBLING SCALLOP OBTAINED BY THE SAME METHOD

BACKGROUND OF THE INVENTION

1. Field of the Invention

This invention relates to a method of manufacturing food resembling scallop and food resembling scallop manufactured by the same method. More particularly, the invention concerns a method, in which material in the form of filaments thermally molded from a material mainly composed of ground fish meat or the like can be integrated by molding without use of any binder such as fish meat paste to obtain food resembling scallop, which can be hardly distinguished both in appearance and texture from the natural scallop meat and can be dressed with batter, crumbs, etc. satisfactorily even at the corners.

2. Description of the Prior Art

Recently, food resembling the scallop meat both in appearance and texture which is manufactured from ground meat of fish, e.g., cod, which called "surimi" is considerably popular along with food resembling crab meat. The food resembling the scallop meat is manufactured in the various ways. In a most general method, ground meat paste is molded into the form of strips, which are then subjected to setting, solidified, heated and then cut into the form of fine filaments. Such fine filaments are gathered together with a binder such as fish meat paste into a cylindrical form, which is then heated and cut to a predetermined length or thickness. FIG. 1 is a perspective view showing a cylindrical mold for producing the molded food material in the prior art method noted above. The mold 1 consists of semi-cylindrical halves 2a and 2b hinged together by a hinge member 2c. These mold halves 2a and 2b are closed with fine filaments 6 of ground meat or the like set in the interior together with a binder such as fish meat paste or like via a film 3. The inner food material is thus compacted into a cylindrical form, which is then put into said mold in order to be hinged together therein by the hinged member 2c. The food material thus obtained is then heated to obtain a cylindrical material as shown in FIG. 2. After the molding, the film 3 covering the molded material 4 is separated, and the material 4 is cut to a constant length, whereby a food product 5 resembling the scallop meat as shown in FIG. 3 is obtained. The food 5 consists of the filaments 6 of ground fish meat or the like which are bound and integrated by the binder. The individual components filaments are straight and extend in parallel, so that the product has a structure closely resembling that of the natural scallop meat.

Japanese Patent Application Disclosure No. 55-40024 discloses another method of manufacturing a food product in a scallop meat fashion. In this method, ground fish meat paste is coated on the surface of a rotating heating roller and dried thereon to form a strip-like material. A binder such as fish meat paste is then thinly coated on the material, and the process is then cut into the form of filaments. These filaments are then boiled and integrated into a cylindrical form using a retainer mold. The material is then cut to substantially the same thickness as the scallop meat to obtain the food resembling the scallop as shown in FIG. 3.

In either of the methods described above, the component filaments which are gathered to extend in a fixed direction, are bound by a binder. Therefore, the filaments are bound too strongly compared to the natural scallop meat so that they cannot be readily separated using chopsticks or a fork. The character of the food is considerably different from the character of the natural scallop meat and its texture is quite different therefrom. In addition, the food 5 resembling the scallop meat manufactured by either of the method noted above, has cut end surfaces so that the corners 5a defined by the end surfaces are sharp unlike the natural scallop meat which has round corners. Therefore, in addition to the fact that the product is considerably different in appearance from the natural scallop meat, crumbs and batter or the like cannot be satisfactorily attached to the corners 5a when dressing the product. When the dressed food is fried, scorch would result at the corners.

U.S. Pat. No. 4,303,688 discloses a method of manufacturing a fibrous fish meat food consisting of straight and parallel filaments like the food resembling the scallop meat noted above. In this method, ground fish meat is kneaded and then molded into a certain shape and then subjected to setting. During the setting period, i.e., while the material has not yet been solidified, the material is cut into filaments. The filaments are then gathered into a cylindrical bundle and then heated to obtain a cylindrical material, which is then cut to a desired length. In this method, material which has not yet been solidified is cut into filaments, which are then gathered and heated. Thus, although the resulting boiled fish paste comprises an inner part coated with an outer surface forming a pellicle united to the inner part when the material is heated, inner filaments are not bound together, so that the product more closely resembles the natural scallop meat both in appearance and texture.

Again the product, however, has cut edges so that its corners are not round but sharp as shown in FIG. 3. Besides, the product has a pellicle surrounding the entire periphery, which is not substantially found in the natural scallop meat. In this respect, substantial analog of the texture of the natural scallop meat cannot be obtained. Further, since the cylindrical material is cut before it is completely solidified, it is liable that the shape of the filaments is spoiled when they are cut. Particularly, the filament shape is greatly spoiled when the filaments are gathered into the cylindrical form. For this reason, it is very difficult to obtain a food product which closely resembles the natural scallop meat.

U.S. Pat. No. 3,852,487 discloses a method of manufacturing fibrous meat products including those of fish meat. In this method, fish or like food is rendered into the form of filaments which are gathered into a bundle, which is then converted into a meat paste with an emulsion material mixed with it. The paste is then extruded such that the filaments substantially extend straight and parallel. The extruded material is then solidified by freezing or heating it. The product obtained by the method, however, contains the emulsion material intervening between filaments, and also the filaments are cut to very small length, i.e., 2 to 50 mm. The product, therefore, is greatly different in structure and texture from the natural scallop meat.

SUMMARY OF THE INVENTION

The present invention seeks to overcome the shortcomings described above. More particularly, an object of the invention is to provide a method of manufacturing a food product resembling the scallop meat which permits a bundle of filaments mainly composed of ground fish meat to be readily integrated by molding without use of any binder and permits a food product which has round corners capable of ready attachment of batter, flour bread crumbs, etc., and a food product resembling the scallop meat obtained by this method.

According to the invention, when thermally molding a bundle of filamentary elements of material mainly composed of ground fish meat into a cylindrical mold, the material is sectionally pressed to form the molding with circumferential annular recesses located at a suitable interval in the longitudinal direction of the molding. The component filaments are thus more strongly bond in the sectionally pressed portions of the molding than in the rest thereof, so that the filaments can be sufficiently integrated without use of any binder.

In addition, according to the invention the filaments are obtained by molding the material into the form of a strip, thermally setting the strip product and then cutting the set product. Thus, the adjacent filaments the bundle provide weak mutual binding forces except the said sectionally pressed portions when the filaments are molded into the cylindrical form, so that structure and texture that closely approximate those of the natural scallop meat can be obtained.

Further, according to the invention the annular recess formed on the periphery of the cylindrical mold has semi-circular or circular axial sectional profile. Thus, when the molding is cut in the recessed portions, the product food has round corners. The product thus closely approximates in appearance as well the natural scallop meat, so that batter, crumbs, etc. can be satisfactorily attached to even the corners. The dressed food thus can be fried uniformly, i.e., without scorch formed at the corners.

BRIEF DESCRIPTION OF THE DRAWINGS

The invention will now be described in detail in conjunction with an embodiment illustrated in the accompanying drawings, in which.

DESCRIPTION OF THE PREFERRED EMBODIMENT

The method of the invention will now be described in detail.

Material mainly composed of ground fish meat is molded into the form of a strip, for instance, which is then subjected to thermally setting. After the material is solidified, it is molded into finely thin filaments. The filaments may be formed by any molding method so long as ground fish meat paste or like material is thermally molded into the form of filaments.

For the material may be used white meat fishes such as Alaska pollack and other white meat fish, and red meat fishes such as mackerel, sardine and krill, shellfish. The shellfish may be usually used in the form of ground meat for molding into the form of strip. It may also be used in the form of minced meat, which called "otoshimi".

The filaments have a rectangular sectional shape when they are formed by slicing the strip as noted above, but it is possible to mold filaments having any other desired sectional shape than the rectangular shape.

Further, such auxiliary materials as vegetable protein, e.g., beans, fats, spices, edible salt and other seasonings may be added. The material may be kneaded with water and additives, if desired, using a kneader or the like into paste, which is molded into strip and subjected to setting by heating. The strip-like material having been kept setting is then cut into fine filaments.

Figure 5B:
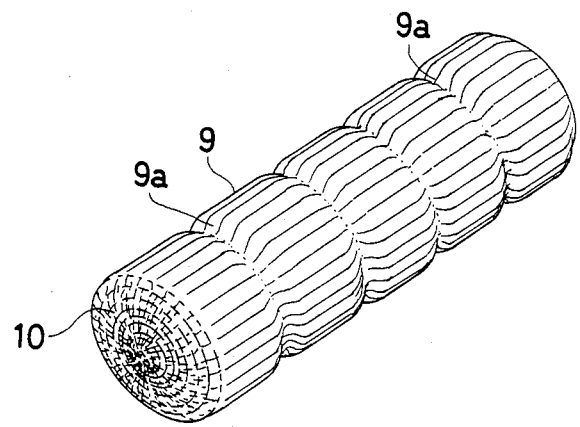
FIGS. 5a and 5b are perspective views showing an intermediate cylindrical molding product obtained using the mold shown in FIG. 4.
Figure 5A:
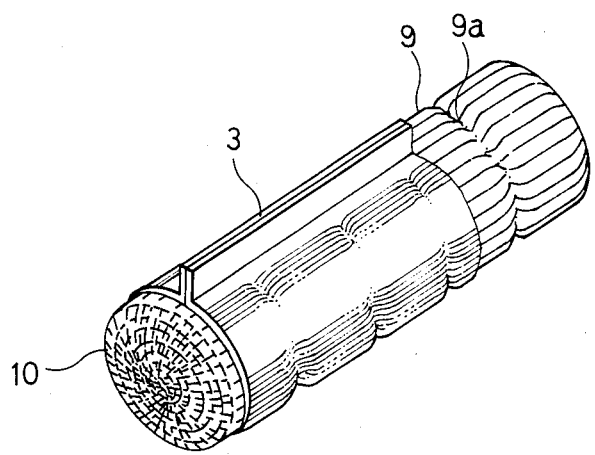

A plurality, particularly a large number, of these filaments are then bundled in a cylindrical form and then press molded by applying peripheral pressure while heating the material to obtain a cylindrical molding product. When molding the filament bundle, while applying a uniform peripheral pressure to the material, extra sectional pressing force is applied so that the cylindrical material have peripheral annular recesses formed at a predetermined interval in the longitudinal direction. The material is heated under composite applied force, whereby a cylindrical material 9 as shown in FIG. 5 can be obtained. The filaments can be integrated without use of any binder such as fish meat paste. The cylindrical material is cut along the center of each annular recess 9a, whereby a food product 11 resembling the scallop meat as shown in FIG. 6, having round corners 11a, can be obtained.

Figure 1:
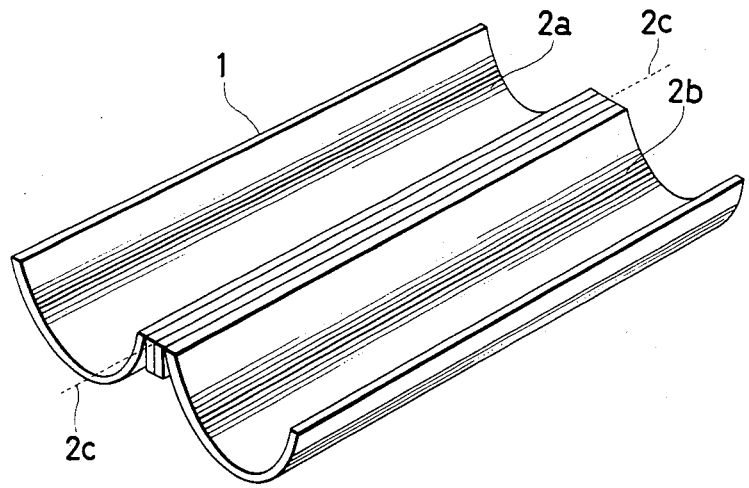
FIG. 1 is a perspective view showing a mold used for a prior art method.
Figure 2:
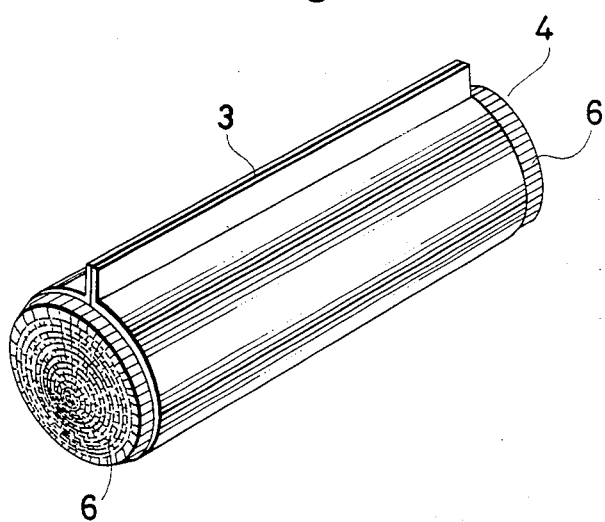
FIG. 2 is a perspective view showing an intermediate cylindrical molding product produced using the mold shown in FIG. 1.
Figure 3:
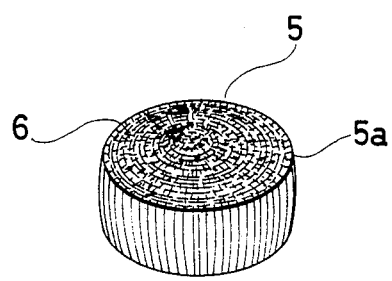
FIG. 3 is a perspective view showing a food product resembling the scallop meat obtained by cutting the molding in FIG. 2.
Figure 4:
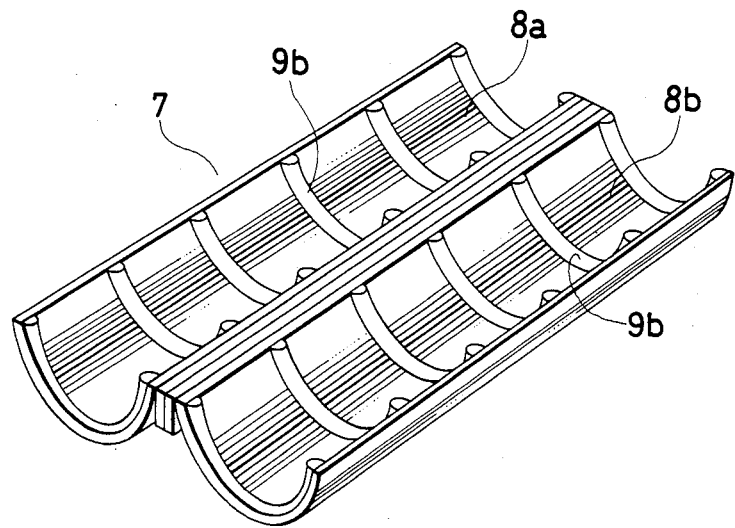
FIG. 4 is a perspective view showing a mold used for molding filaments of material into a cylindrical form by a method according to the invention.

FIG. 4 shows a mold 7 which is used for carrying out the method of the invention. It consists of two semi-cylindrical halves 8a and 8b hindged together along their adjacent edges. The inner surfaces of the mold halves 8a and 8b, which define a molding chamber, are provided with circumferential rod members 9a with a diameter of 2 to 10 mm welded to them at predetermined interval. Thus, when the two semi-cylindrical halves 8a and 8b of the mold 7 is closed with a number of filaments 10 along the longitudinal axis of said mold 7 and covered with film 3 as shown in FIG. 5, the filament bundle is pressed from the outer periphery by a predetermined pressure while it is also sectionally further pressed by the circumferential rods 9b, whereby the peripheral recesses 9a are formed. In this state, the material is boiled or otherwise heated, whereby the component filaments 10 separated from film 3 are integrated to obtain the cylindrical material 9 as shown in FIG. 5b. The cylindrical material 5 has the peripheral annular recesses spaced apart at a predetermined interval, the filaments 10 being strongly bonded in these recessed portions.

With the prior art methods, the filament bundle is molded by application of uniform peripheral pressure, as mentioned earlier. With the solitary application of the peripheral pressure, the individual filaments are bound only weakly, so that usually a binder such as meat paste is used to reinforce the binding. In contrast, according to the invention the filaments 10 in the bundle are sectionally pressed by means of the circumferential rods 9b in addition to the application of uniform peripheral pressure, so that they are very strongly bound at the recessed portions 9a. Thus, sufficient binding of the filaments can be obtained without use of any binder, structure and texture closely approximate those of the natural scallop meat can be obtained.

Figure 6:
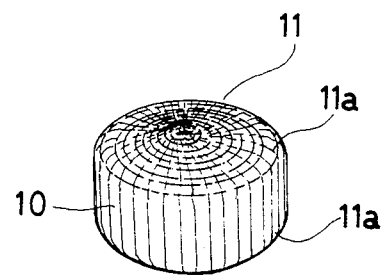
FIG. 6 is a perspective view showing a food product resembling the scallop meat obtained by cutting the molding shown in FIG. 5b in the center of the sectionally pressed portion.

The cylindrical material 9 is cut along the center of each peripheral annular recess 9a as shown in FIG. 5b, whereby a food product resembling the scallop meat as shown in FIG. 6 can be obtained, which has round opposite side corners 11a over the entire periphery and closely approximate the appearance, structure and texture of those of the natural scallop meat.

An example of the invention is given below.

100% by weight of ground meat of Alaska pollack and 2% by weight of edible salt were kneeded in the ordinary mannner using a food cutter. 35% by weight of water and a desired mount of seasoning such as an extract from the natural scallop meat were added to the mixture, and the admixture was kneeded for five minutes to obtain a pastelike material.

The said material was then molded into a continuous strip, which was then boiled at a temperature at 80° to 85° C. while it was transported continuously. The strip was then sliced in its longitudinal direction into fine filaments having a sectional area of 1 mm by 1 mm.

A given number of these filaments are then bundled and integrated using the mold shown in FIG. 4. The mold had circumferential rods with a diameter of 2 mm welded at a predetermined interval to the inner wall surface of its two halves. By closing the mold with the filament bundle covered with film 3, the filament bundle was sectionally pressed by the circumferential rods while it was peripherally uniformly pressed by a predetermined pressure.

In this state, the material was heated again by boiling, whereby the filaments in the bundle were firmly bonded in the recessed portions formed by the circumferential rods. After removing film 3 covering the filament bundle, a cylindrical material as shown in FIG. 5b was thus obtained, which has peripheral annular recesses formed at a predetermined interval.

The circular material was cut along the center of each peripheral annular recess, whereby a food product resembling the scallop meat as shown in FIG. 6 could be obtained. It has round opposite end corners, and its component filaments were sufficiently bound together at the opposite ends. Its appearance, structure and texture were substantially the same as those of the natural scallop meat.

In panel testing by 100 persons, who took the fry of the said food prepared by dressing it with batter and crumbs, and most of the members could not distinguish the food from the natural scallop meat fry, which was also prepared in the same way and served for the purpose of comparison. The sectional structure of the product obtained according to the invention and that of the natural scallop meat were compared, and the two could not be substantially distinguished from each other for the product was such that its filaments were not strongly bound over its substantial length or thickness but are strongly bound at the opposite ends.

I claim:

1. A method of manufacturing a food product resembling scallop meat comprising the steps of:
    preparing thermally molded filaments of a material comprising ground fish meat;
    thermally molding a plurality of these filaments without use of any binder into a cylindrical integrated material having a plurality of peripheral annular recesses spaced apart at a predetermined interval in the longitudinal direction, said filaments being oriented along the longitudinal axis; and
    cutting said cylindrical material along the center of each said peripheral annular recess.

2. The method according to claim 1, wherein said material forming said filaments to be thermally molded into said cylindrical material is prepared as a paste and additionally comprises at least one of vegetable protein, fats and seasonings.

3. The method according to claim 1, wherein said material is molded into a continuous strip, then thermally subjected to setting and then cut in the longitudinal direction into fine filaments.

4. The method according to claim 1, wherein said plurality of said filaments are molded using a mold having two semi-cylindrical halves and hinged together along adjacent edges, the innner surfaces of said mold halves being provided with a plurality of circumferential ridges located at a predetermined interval.

5. The method accoring to claim 1, wherein each said peripheral annular recess has a semi-circular or arcular sectional profile.

6. A food product resembling scallop meat manufactured by the method according to claim 1.

7. A food product resembling scallop meat manufactured by the method according to claim 5.

* * * * *